United States Patent [19]
Van Duijneveldt

[11] Patent Number: 5,975,722
[45] Date of Patent: Nov. 2, 1999

[54] BACKLIGHT LUMINAIRE

[75] Inventor: Wido Van Duijneveldt, Eindhoven, Netherlands

[73] Assignee: Flat Panel Display Co. B.V., Eindhoven, Netherlands

[21] Appl. No.: 08/916,776

[22] Filed: Aug. 20, 1997

[30] Foreign Application Priority Data

Sep. 18, 1996 [EP] European Pat. Off. .............. 96202609

[51] Int. Cl.[6] ....................................................... F21V 7/00
[52] U.S. Cl. .......................... 362/296; 362/346; 362/347; 359/851
[58] Field of Search ............................. 359/851; 362/296, 362/297, 341, 346, 347

[56] References Cited

U.S. PATENT DOCUMENTS 5,143,433  9/1992  Farrell ....................................... 362/29
5,555,162  9/1996  Shemitz ..................................... 362/225

FOREIGN PATENT DOCUMENTS

2207496  2/1989  United Kingdom ............. B60Q 3/04

Primary Examiner—Cassandra Spyrou
Assistant Examiner—E. Cherry
Attorney, Agent, or Firm—F. Brice Faller

[57] ABSTRACT

A backlight luminaire (50) is provided with at least two tubular fluorescent lamps (44, 45), with portions of the lamps (44, 45) exhibiting a variation in spectral characteristic in the longitudinal direction. The portions of the lamps are so positioned relative to each other that the spectral characteristic of a portion of a first lamp (44) and the spectral characteristic of a portion of a second lamp (45), which portions are arranged one beside the other, vary in opposite directions. The luminaire is further provided with a plurality of sub-reflectors (42, 43), the majority of the sub-reflectors (43) being provided with said portion of the first lamp (44) and said portion of the second lamp (45). Preferably, the majority of the lamps (44, 45) is distributed over more than one sub-reflector (43). Preferably, the lamps (44, 45) are U-shaped and alternately connected in series. The backlight luminaire (50) is employed in liquid-crystal display devices (51) in order to attain a light distribution having a uniform spectral characteristic.

12 Claims, 5 Drawing Sheets

BACKLIGHT LUMINAIRE

BACKGROUND OF THE INVENTION

The invention relates to a backlight luminaire for a display device, which luminaire comprises at least a first and a second fluorescent lamp with a longitudinal direction.

The invention also relates to a liquid-crystal display device which includes a backlight luminaire.

Backlight luminaires are used as a light source in flat-panel type display devices, in particular liquid-crystal display devices (LCD devices).

Fluorescent lamps are very suitable for use as light sources in flat-type display devices because they have a high light output and the spectral characteristic of the light emitted can be adapted in a simple manner. In such display devices, a luminaire, which is arranged behind the display, is generally provided with elongated fluorescent lamps which are arranged in parallel relation to each other. It is alternatively possible to use U-shaped fluorescent lamps or so-called meander-shaped fluorescent lamps.

GB-A 2 207 496 discloses a backlight luminaire which is used as a light source for a liquid-crystal display (LCD) device, which luminaire includes a plurality of U-shaped fluorescent lamps which are alternately arranged at the back of a liquid-crystal display device. On the side of the backlight luminaire facing away from the liquid-crystal display device, there is provided a reflector including reflectors or an assembly of sub-reflectors. In general, the (sub-)reflectors are concave in shape. In the known backlight luminaire, one of the arm portions of one of the U-shaped fluorescent lamps is inserted between the arm portions of an adjacent lamp or lamps so as to be parallel thereto.

In general, it is desirable that the backlight luminaires should uniformly illuminate the active portion of the display device.

A disadvantage of the known backlight luminaire is that the light output of the luminaire exhibits variations in spectral characteristic.

OBJECTS AND SUMMARY OF THE INVENTION

It is an object of the invention to provide a backlight luminaire in which the above-mentioned effect is reduced or obviated.

To this end, the backlight luminaire in accordance with the invention is characterized in that portions of the first and the second lamp exhibit a variation in spectral characteristic in the longitudinal direction, the spectral characteristic of a portion of the first lamp and of a portion of the second lamp, which portions are arranged one beside the other, varying in opposite directions.

The inventor has recognized that the spectral characteristic, for example the color point, of fluorescent lamps is not uniform over the length of the lamps. A variation in spectral characteristic of the lamp is generally caused by spreads occurring in the production process of fluorescent lamps, which variation occurs, for example, during filling the lamp with a phosphor mixture. As a result of different physical properties, some components of the (three-)phosphor mixture adhere more rapidly to the lamp than others. In general, the filling operation takes place on one side from an end portion of the lamp, so that the spectral characteristic of the lamp changes over the length of the lamp, which leads, for example, to a difference in color point over the length of the fluorescent lamp. By positioning the adjacent portions of the first and the second lamp relative to each other, a variation in spectral characteristic of the portions is compensated for, which results in an improvement of the spectral characteristic of the backlight luminaire. In general, the adjacent (portions of the) lamps are so positioned relative to each other that the spectral characteristic of the sum of the (parts of the) lamps varies less than the spectral characteristic of each of the individual (parts of the) lamps.

The luminaire is further provided with a reflector comprising a plurality of sub-reflectors, and a number of sub-reflectors are provided with the portion of the first lamp and the portion of the second lamp.

If a sub-reflector in accordance with the invention is provided with (the above-mentioned portion of) the first lamp and with (the above-mentioned portion of) the second lamp, the reflector enhances the compensating effect. This results in an improved uniformity of the light output of the backlight luminaire. If lamps are positioned, in accordance with the invention, in sub-reflectors, (said portions of) the lamps are so positioned relative to each other in one sub-reflector that the spectral differences between the lamps are averaged out or leveled off. By orienting (the portions of) the lamps in the above-described manner, spectral differences in one (portion of a) lamp are compensated for by arranging (the portion of) the lamp in the vicinity of one (portion of a) lamp having a spectral characteristic which varies in the opposite direction.

Depending on the shape of the fluorescent lamps used, the above can be realized by the manner in which (the portions of) the lamps are arranged in one sub-reflector. If the lamps are oriented in a backlight luminaire in accordance with the inventive measure, as will be explained in greater detail by means of examples, variations in spectral characteristic of the light output of the luminaire are effectively reduced or obviated.

An embodiment of the backlight luminaire in accordance with the invention is characterized in that at least a number of the lamps extend in at least two sub-reflectors.

By accommodating portions of the fluorescent lamps in two or more sub-reflectors and by providing the sub-reflectors with a portion of at least two lamps, the effect of the fact that one of the lamps emits light having a different spectral characteristic (for example, if two lamps have a different color appearance) is distributed (spread out) over different sub-reflectors of the backlight luminaire. By virtue of said spread, the nonuniformity of the light distribution is spread out over a relatively large area of the backlight luminaire and becomes, relatively, less visible owing to the presence (of portions) of other lamps. If the lamps exhibit a variation in spectral characteristic over their length, the portions of the lamps are so distributed over the sub-reflectors that said variations are of opposite sense. By virtue thereof, the variation in spectral characteristic of a portion of a first lamp in one sub-reflector is compensated for in that a portion of a second lamp is provided in the same sub-reflector, with the spectral characteristic of said portion of the second lamp and the spectral characteristic of said portion of the first lamp varying in opposite directions. Variations in spectral characteristic of the light output of the backlight luminaire are effectively reduced or obviated by suitably orienting the (portions of the) lamps in (the sub-reflectors of) the backlight luminaire relative to each other.

In the known luminaire, the effect of a deviation in a fluorescent lamp is limited to the sub-reflector accommodating said lamp, and a spectral variation of the backlight luminaire manifests itself more clearly.

An embodiment of the backlight luminaire in accordance with the invention is characterized in that the lamps comprise at least a first arm portion and a second arm portion, which arm portions are arranged in side-by-side relation to each other and are interconnected via a connecting portion, the first arm portion being accommodated in a first sub-reflector and the second arm portion being accommodated in a second sub-reflector.

By using lamps having arm portions which extend one beside the other (in general, the arm portions are at least substantially parallel to each other) and which are interconnected via a connecting portion, it is achieved that the first arm portion of one of the lamps is always provided in one of the sub-reflectors while the second arm portion of the lamp is provided in one of the other (adjacent) sub-reflectors. This results, in the case of sub-reflectors extending one beside the other, in a compact and efficient distribution of the fluorescent lamps in the backlight luminaire, so that the uniformity of the light output of the backlight luminaire is improved. A (fluorescent) lamp comprising two at least substantially parallel arm portions which are interconnected via a connecting portion, is referred to as a U-shaped or V-shaped lamp. A lamp comprising a plurality of parallel arm portions which are interconnected via a number of connecting portions, which connecting portions also extend parallel to each other, is referred to as a meander-shaped fluorescent lamp.

If, for example as a result of fabrication spreads, the U-shaped fluorescent lamps exhibit, for example, an at least substantially reproducible variation in spectral characteristic, mutual differences between arm portions of lamps can be compensated for by a suitable distribution of the arm portions over the sub-reflectors. If the lamps exhibit a variation in color point over their length, as a result of which, for example, a first arm portion of a lamp has a "bluish" color and a second arm portion of the lamp has (relative to the first arm portion) a more "yellowish" color, then this difference in spectral characteristic between the arm portions can be compensated for if in one sub-reflector the "bluish" arm portion of one lamp is combined with the "yellowish" arm portion of the other lamp. This distribution of the arm portions of lamps over two different sub-reflectors causes spectral differences in an arm portion of a lamp to be compensated for by arranging said arm portion of the lamp proximate to an arm portion of a further lamp having a spectral characteristic which varies in the opposite direction.

Preferably, all (portions of the) fluorescent lamps are so provided in the backlight luminaire and oriented relative to each other that the spectral characteristic of two portions, which are arranged one beside the other in one sub-reflector, varies in opposite directions. Depending on the shape of the fluorescent lamps used, this requirement places conditions up on the way in which (the portions of) the lamps are arranged in one sub-reflector. If the fluorescent lamps are elongated and (at least) two lamps are entirely arranged one beside the other in one sub-reflector, an effective compensation of an (at least substantially reproducible) variation in spectral characteristic in each of the lamps is attained by alternately (in opposite directions) arranging the lamps having a defined variation in the sub-reflector. If the fluorescent lamps are elongated or U-shaped, and if an (arm) portion of a first lamp and an (arm) portion of a second lamp are arranged one beside the other in one sub-reflector, an effective compensation of an (at least substantially reproducible) variation in spectral characteristic in each one of said (arm) portions of the (at least two) lamps is attained by always alternately arranging the (arm) portions of the lamps having a defined variation in the sub-reflector in such a way that the spectral variation in said (arm) portion of the first lamp is compensated for by the spectral variation in said (arm) portion of the second lamp, which spectral variation changes in the opposite direction. In the adjacent sub-reflectors, corresponding (arm) portions of the (at least two) elongated or U-shaped lamps are accommodated in such a manner that also in these sub-reflectors the spectral variations of the (arm) portions of the lamps compensate each other; the (arm) portion of a lamp compensating for the spectral characteristic of the corresponding (arm) portion of the first or the second lamp may alternatively form part of a third lamp. By orienting all (portions of the) lamps in a backlight luminaire in accordance with the invention, variations in spectral characteristic of the light output of the luminaire are effectively reduced or obviated.

An embodiment of the backlight luminaire in accordance with the invention is characterized in that at least two of the lamps are connected in series. As (alternating-current) power sources for fluorescent lamps do not have (exactly) the same output characteristic, two lamps connected to two different power sources may have different spectral characteristics, which leads to a non-uniform light output of the active part of the display device. The effect of differences between two power sources is reduced and, hence, the uniformity of the light distribution of the backlight luminaire is further improved by connecting at least two lamps in series.

A preferred embodiment of the backlight luminaire in accordance with the invention is characterized in that the lamps are alternately connected in series. In this Application, the expression "lamps which are alternately connected in series", is to be understood to mean that two (arm) portions of two lamps, which (arm) portions are arranged one beside the other in one sub-reflector, are not connected to the same power source. By alternately connecting the lamps in series, it is precluded that the effect of a power source having a slightly different voltage characteristic, which leads to variations in the spectral characteristic of (at least) one of the (fluorescent) lamps, is distributed over two (arm) portions of the lamps arranged one beside the other in one sub-reflector.

Preferably, the lamps are alternately connected in series in such a manner hat no two (arm) portions of two (different) lamps in one sub-reflector are connected to one power source. This can be brought about, for example, by groupwise (alternately) connecting the lamps in series or by alternately connecting all lamps in series. If two or more power sources are used and if the various power sources are suitably connected to the lamps, the effect of failure of one of the power sources on the light distribution can be minimized.

BRIEF DESCRIPTION OF THE DRAWINGS

The Figures are purely schematic and not drawn to scale. In particular for clarity, some dimensions are exaggerated strongly. In the Figures, like reference numerals refer to like parts, whenever possible.

DESCRIPTION OF THE PREFERRED EMBODIMENTS

Figure 1A:
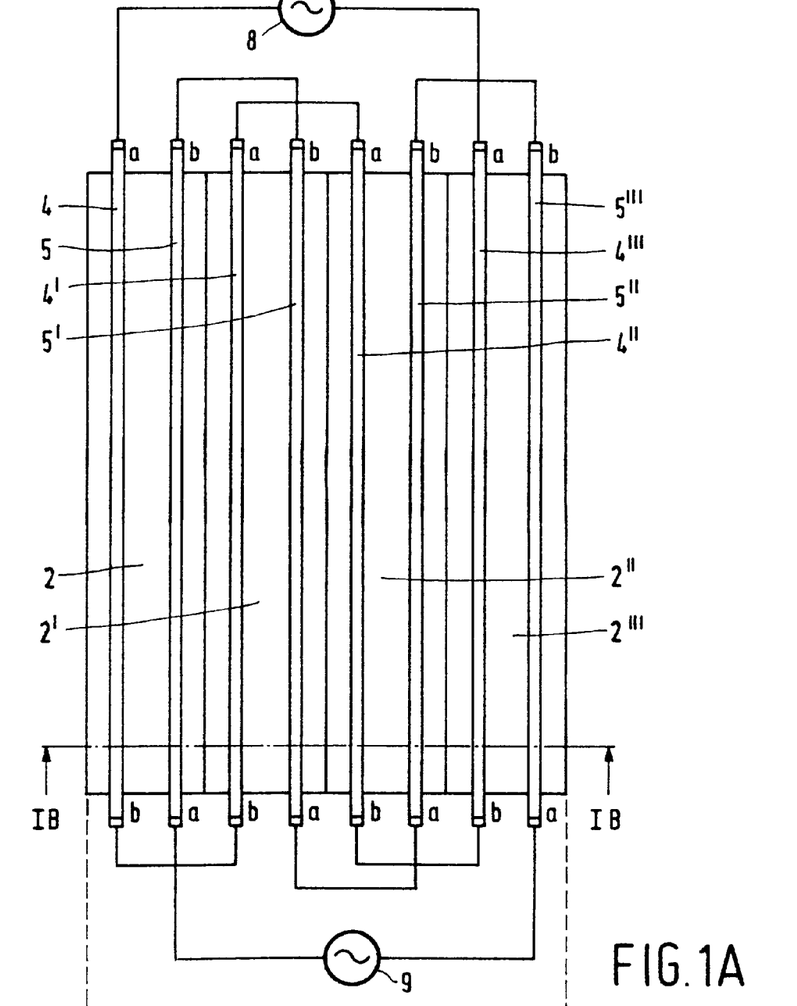
FIG. 1A is a plan view of an embodiment of the backlight luminaire in accordance with the invention, which is provided with fluorescent lamps.
Figure 1B:
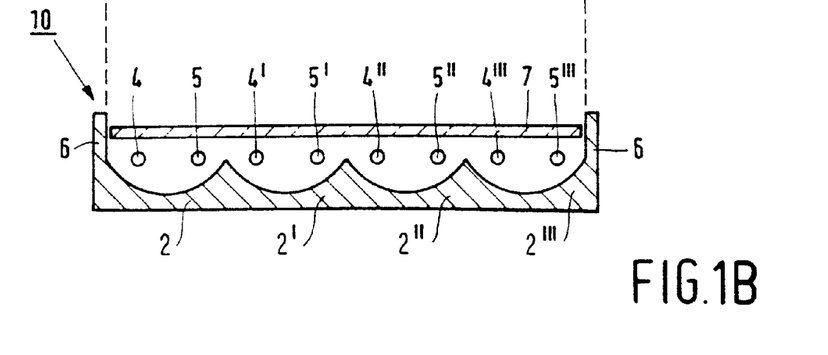
FIG. 1B is a cross-sectional view of the backlight luminaire, taken on the line IB—IB in FIG. 1A.

FIG. 1A is a schematic, plan view of an embodiment of the backlight luminaire in accordance with the invention, which is provided with fluorescent lamps 4, 5, and FIG. 1B is a schematic, cross-sectional view of the backlight luminaire 10 shown in FIG. 1A, which luminaire is further provided with a light-scattering cover 7 (diffusor) which is supported by walls 6. The backlight luminaire 10 comprises a group of sub-reflectors 2, 2', 2", 2"', which sub-reflectors are arranged in a side-by-side relation.

The (sub-)reflectors comprise directed reflectors which direct the direct and indirect light generated in the backlight luminaire towards the display device. In general, the reflectors are concave in shape and provided, for example, with a matt, white coating which brings about a (diffuse) reflection of the light emitted (by the lamps) in a direction away from the display device. The expression "concave (sub-)reflector" must be taken to mean hereIN that the lamps are accommodated in a chamber (the sub-reflector) comprising a rear wall facing away from the display device and (oblique) vertical side walls, or a rear wall and side walls which are completely or partly pit-shaped.

As a result of fabrication spreads, these lamps exhibit variations in the spectral characteristic. This spread in spectral characteristic over the length of the fluorescent lamps occurs, for example, during filling the lamp with a phosphor mixture whose components have different physical (and chemical) properties. As a result of the difference in properties, some of the above-mentioned components adhere more rapidly to the lamp than others, so that the ratio between the components, which ratio determines the spectral characteristic, changes as a filling column comprising the (three-)phosphor mixture is displaced along the inside of the (cylindrical) glass tube. In general, the filling operation is performed on one side from an end portion of the lamp, so that the spectral characteristic of the lamp (gradually) changes over the length of the lamp, which leads, for example, to a difference in color point over the length of the fluorescent lamp. In a production process, this spectral distribution over the length of the fluorescent lamp is substantially identical for each lamp.

In the example shown in FIG. 1A, each sub-reflector 2 accommodates two discrete fluorescent lamps 4, 5. The variation in spectral characteristic over the length of the fluorescent lamps 4, 5 is indicated by the letters a and b, which letters are shown, in FIG. 1A, near the end portions of the lamps 4, 5. If the lamps exhibit a variation in color point over their length, with, in the example shown in FIG. 1A, the spectral characteristic varying, from the first end portion (a) of lamp 4, 5, from, for example, a relatively "bluish" color to, for example, a relatively "yellowish" color near the second end portion (b) of the lamp 4, 5, and the spectral characteristic between the end portions a and b exhibiting a (gradual) change, then the difference in spectral characteristic between the lamps 4 and 5 is compensated for if the "bluish" end portion (a) of one lamp is arranged next to the "yellowish" end portion (b) of the other lamp, and conversely. The compensating effect occurs if two lamps are arranged one beside the other in two adjacent sub-reflectors, in accordance with the measure of the invention, i.e. in the example shown in FIG. 1A, the lamps 5 and 4' are arranged, respectively, in the sub-reflectors 2 and 2', the lamps 5' and 4" are arranged, respectively, in the sub-reflectors 2' and 2", and the lamps 5" and 4"' are arranged, respectively, in the sub-reflectors 2" and 2"'. The compensating effect is further enhanced if the lamps are arranged, in accordance with the measure of the invention, so as to extend one beside the other in the same sub-reflector, i.e., in the example shown in FIG. 1A, the lamps 4 and 5 are accommodated in the sub-reflector 2, the lamps 4' and 5' are accommodated in the sub-reflector 2', the lamps 4" and 5" are accommodated in the sub-reflector 2" and the lamps 4"' and 5"' are accommodated in the sub-reflector 2"'.

Preferably, all lamps which are arranged one beside the other in two adjacent sub-reflectors are oriented in accordance with the principle a-b opposite b-a, and, in a further preferred embodiment in accordance with the invention, the spectral characteristics of all lamps arranged in one sub-reflector are alternately oriented according to the above-mentioned principle. As a result of these measures, which cause the spectral characteristics of lamps arranged one beside the other in one or more sub-reflectors, to vary relative to each other in opposite directions, the effect of small (at least substantially reproducible) deviations in fluorescent lamps is averaged out, which leads to a substantial improvement of the uniformity of the backlight luminaire 10.

In addition, in the example shown in FIG. 1, the lamps 4, 5 are alternately connected in series in such a manner that (portions of) lamps 4, 5 in one sub-reflector 2 are not connected to the same power source. In FIG. 1A two power sources 8, 9 (also referred to as inverters) are used, with one half 4 of the fluorescent lamps being connected in series to the first power source 8 and the other half 5 of the fluorescent lamps being connected in series to the second power source 9. In an alternative embodiment of FIG. 1, the lamps may also be connected pairwise (and alternately) to a power source. In this case, four power sources are necessary.

Figure 2A:
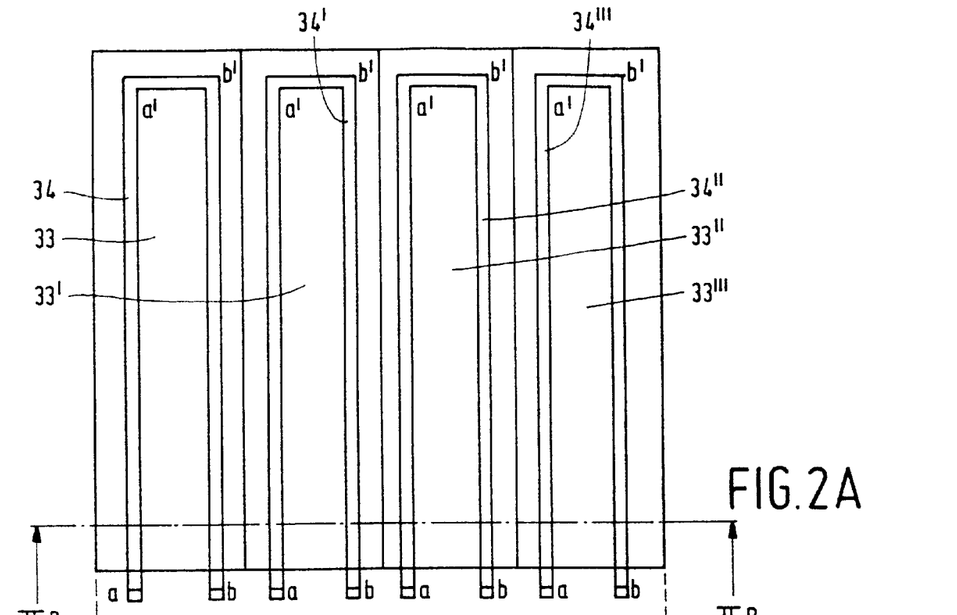
FIG. 2A is a plan view of an embodiment of the backlight luminaire in accordance with the invention, which is provided with U-shaped fluorescent lamps.
Figure 2B:
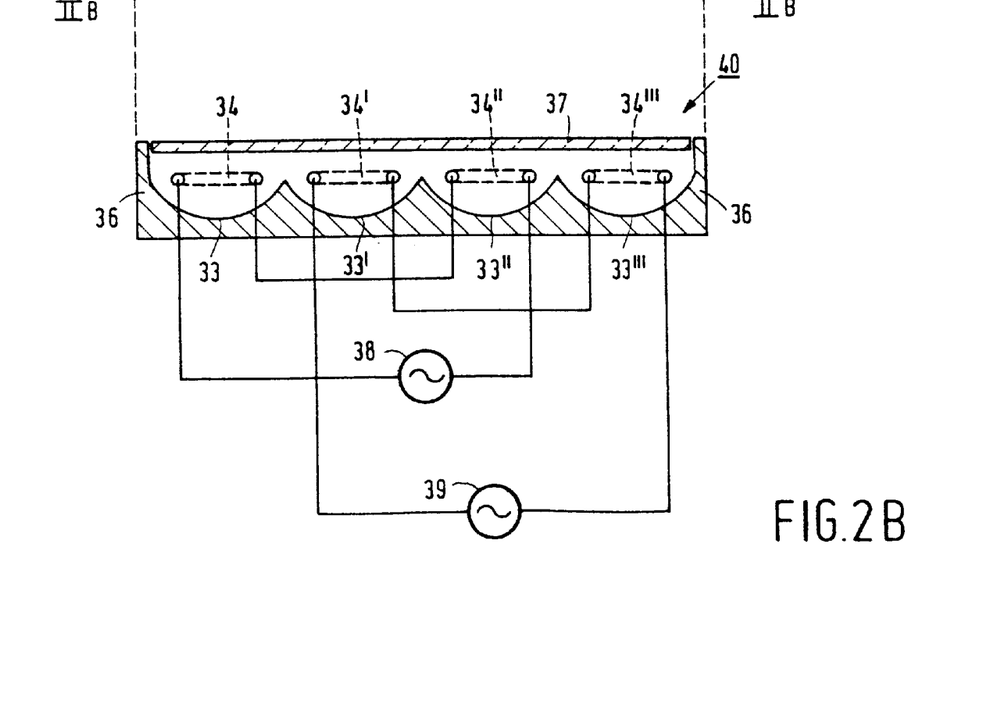
FIG. 2B is a cross-sectional view of the backlight luminaire, taken on the line IIB—IIB in FIG. 2A.

FIG. 2A is a schematic plan view of an embodiment of the backlight luminaire in accordance with the invention, which is provided with U-shaped fluorescent lamps 34, 34', 34", 34"', and FIG. 2B is a schematic, cross-sectional view of the backlight luminaire 40 shown in FIG. 2A, which luminaire is further provided with a light-scattering cover 37 which is supported by walls 36. In the example shown in FIG. 2, the backlight luminaire 40 comprises a group of sub-reflectors 33, 33', 33", 33"', which sub-reflectors are arranged one beside the other.

In the example shown in FIG. 2A, each sub-reflector 33, 33', 33", 33"' accommodates one U-shaped fluorescent lamp 34, 34', 34", 34"', respectively. The variation in spectral characteristic over the length of the fluorescent lamps 34 is indicated, in FIG. 2A, by the letters a, a', b and b'. If the lamps exhibit a color-point variation over their length, with, in accordance with the example shown in FIG. 2A, the spectral characteristic varying from the first end portion (a) of lamp 34, 34', 34", 34"' from, for example, a relatively "bluish" color via the portions of the U-shaped lamps near the connecting portion referenced a' and b', to, for example, a relatively "yellowish" color near the second end portion (b) of the lamp 34, 34', 34", 34'", with a variation in spectral characteristic occurring between the end portions a and b, the difference in spectral characteristic between the second arm b–b' of lamp 34, 34', 34", which is accommodated in the sub-reflector 33, 33', 33", respectively, is compensated for by the corresponding first arm a–a' of lamp 34',34",34'", and which is accommodated in the sub-reflector 33', 33", 33'". This way of orienting the lamps in the sub-reflectors relative to lamps in adjacent sub-reflectors causes the uniformity of the backlight luminaire 40 to be improved. Preferably, all lamps 34, 34', 34", 34'" in the sub-reflectors 33, 33', 33", 33'" are arranged in this manner.

In addition, in the example shown in FIG. 2A and 2B, the lamps 34, 34', 34", 34'" are alternately connected in series, in such a manner that adjacent lamps are not connected to the same power source. In FIG. 2B, two power sources 38, 39 are employed, with one half 34, 34" of the fluorescent lamps being connected in series to the first power source 38 and the other half 34', 34'" of the fluorescent lamps being connected in series to the second power source 39.

Figure 3A:
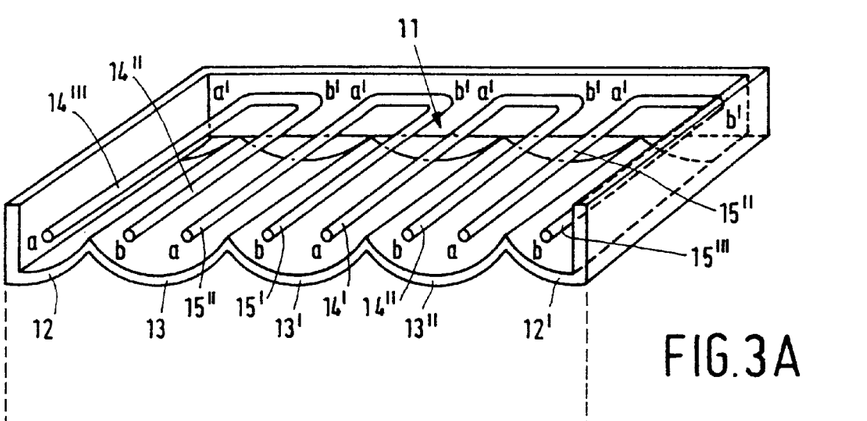
FIG. 3A is a perspective view of a further embodiment of the backlight luminaire in accordance with the invention, which is provided with U-shaped fluorescent lamps.
Figure 3B:
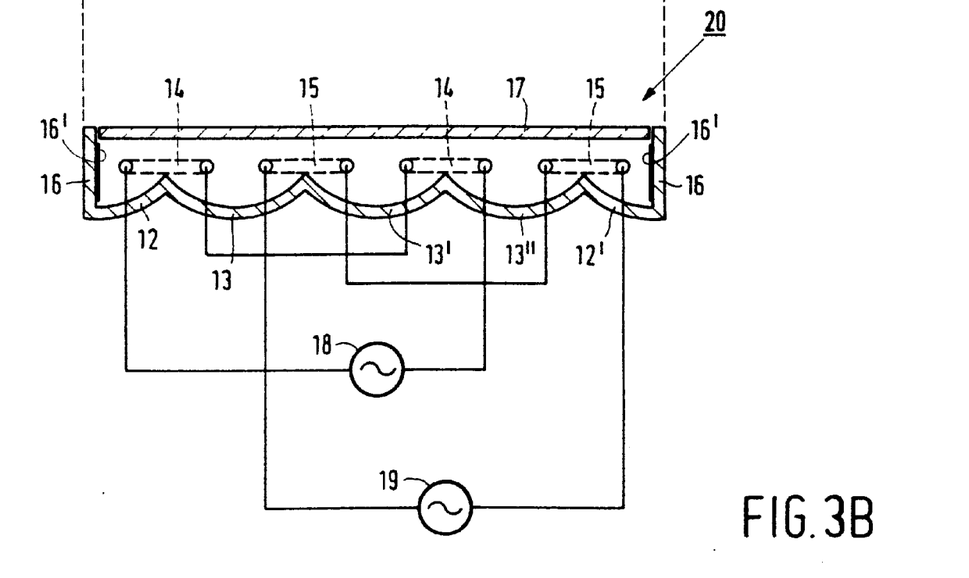
FIG. 3B is a cross-sectional view of the backlight luminaire shown in FIG. 3A.

FIG. 3A is a very schematic, perspective view of a backlight luminaire in accordance with a further embodiment of the invention, which is provided with U-shaped fluorescent lamps 14, 15, and FIG. 3B is a very schematic, cross-sectional view of the backlight luminaire 20 shown in FIG. 3A, which luminaire is further provided with a light-scattering cover 17 which is supported by walls 16. In FIG. 3A, each first and second arm of the U-shaped fluorescent lamps 14, 15 is indicated by a reference numeral 14', 14" and 14'", and 15', 15" and 15'", respectively. In the example shown in FIG. 3, the majority of the sub-reflectors 13, 13', 13" always accomodates first and second arms of two discrete U-shaped lamps, for example arms having reference numeral 14' and 15' are situated in sub-reflector 13' and arms having reference numeral 14" and 15" are situated in sub-reflector 13 and in sub-reflector 13". In this example, at both edges of the backlight luminaire 20 there are provided two "half" sub-reflectors 12, 12' which each comprise only one arm 14'", 15'" of a fluorescent lamp. The light output and the uniformity (homogeneity) of the light distribution are further improved if the (vertical) walls of the "half" sub-reflectors 12, 12' are provided with a reflective layer 16' having a high reflection coefficient. Another arrangement of the sub-reflectors and the lamps enables these "half" sub-reflectors in the backlight luminaire to be avoided. In the example shown in FIG. 3A, the connecting portions of the U-shaped fluorescent lamps 14, 15, which connect the at least substantially parallel arms to each other, are incorporated in a transition portion 11 between the sub-reflectors of the backlight luminaire 20, and hence are an integral part of the backlight luminaire, in order to maximize the light output of the backlight luminaire. In an alternative embodiment, these connecting portions are situated on the outside of the backlight luminaire 20.

The sub-reflectors 13, 13', 13" always accommodate two different arm portions of fluorescent lamps 14, 15. The variation in spectral characteristic over the length of the fluorescent lamps 14, 15 is indicated in FIG. 3A by means of the letters a, a', b and b'. If the lamps exhibit a color-point variation over their length, with, in accordance with the example shown in FIG. 3A, the spectral characteristic varying, from the first end portion (a) of lamp 14, 15, from a relatively "bluish" color via the portions of the U-shaped lamps near the connecting portion indicated by the letters a' and b', to a relatively "yellowish" color near the second end portion (b) of lamp 4, 5, with the spectral characteristic varying (gradually) between said end portions a and b, the difference in spectral characteristic between the lamps 14, 15 is compensated for if, in one sub-reflector 13, arms a–a' are arranged next to arms b-b', and conversely. Preferably, all lamps arranged in one sub-reflector 13 are provided according to the above-described principle a–a' opposite b–b', and, in a further preferred embodiment in accordance with the invention, the spectral characteristics of all lamps in adjacent sub-reflectors 13, 13', 13" are alternately arranged in the manner described hereinabove. By virtue of the measures, which cause characteristics of portions of lamps, which are arranged one beside the other in one or more sub-reflectors, to vary relative to each other in opposite directions, the effect of deviations in fluorescent lamps is leveled off (averaged out), which leads to an improvement of the uniformity of the backlight luminaire 20.

In addition, in the example shown in FIG. 3, the lamps 14, 15 are alternately connected in series in such a manner that (portions of) lamps 14, 15 in one sub-reflector 13 are not connected to the same power source. In FIG. 3B, two power sources 18, 19 are employed, with the two U-shaped lamps 14 being connected in series to the first power source 18 and the other two U-shaped lamps 15 being connected in series to the second power source 19.

Figure 4A:
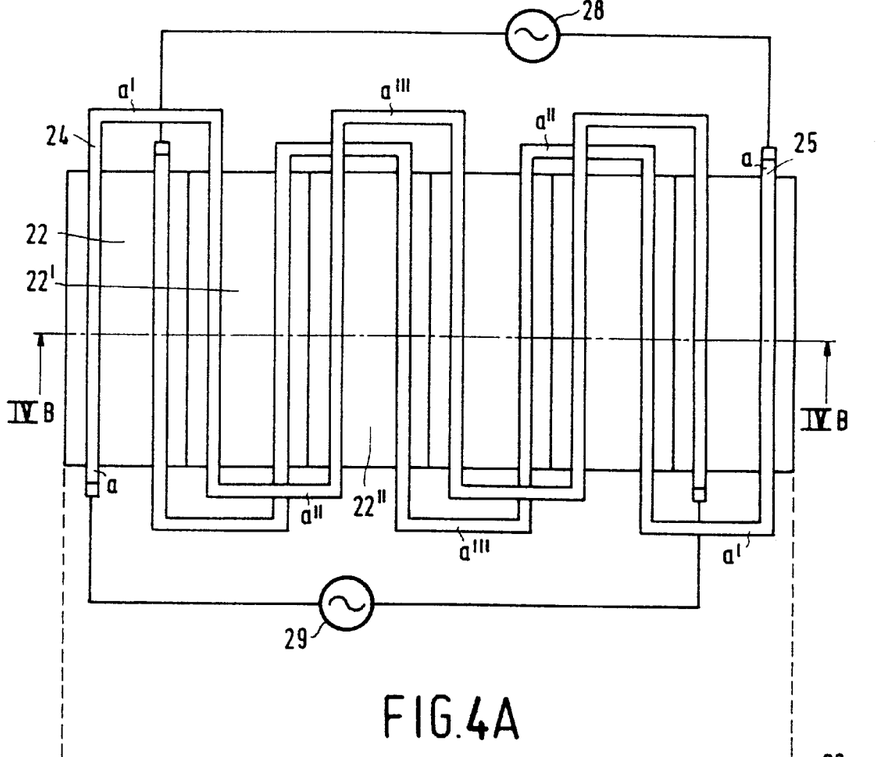
FIG. 4A is a plan view of an embodiment of the backlight luminaire in accordance with the invention, which is provided with meander-shaped fluorescent lamps.
Figure 4B:
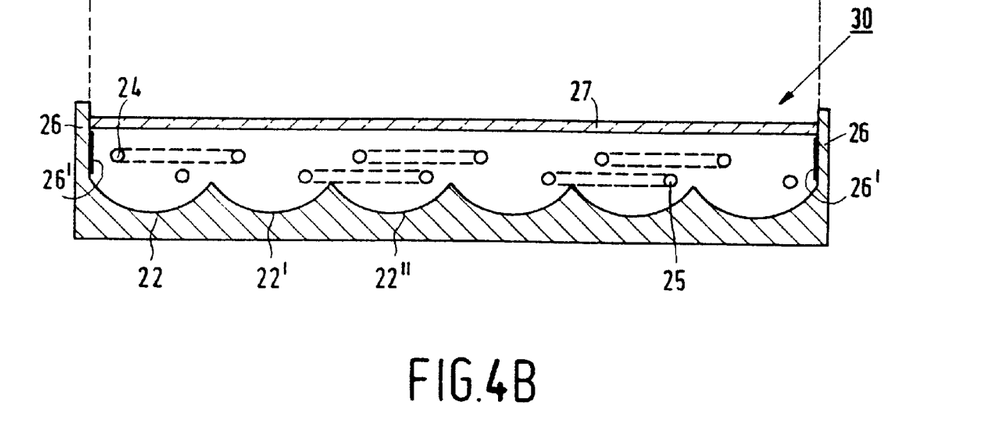
FIG. 4B is a cross-sectional view of the backlight luminaire, taken on the line IVB—IVB in FIG. 4A.

FIG. 4A is a schematic, plan view of an embodiment of the backlight luminaire in accordance with the invention, which is provided with two so-called meander-shaped fluorescent lamps 24, 25, and FIG. 4B is a schematic, cross-sectional view of the backlight luminaire 30 shown in FIG. 4A, which luminaire is further provided with a light-scattering cover 27 which is supported by walls 26. A meander-shaped fluorescent lamp 24, 25 generally comprises a hermetically sealed, tubular lamp envelope having (multiple) M-shaped bends, as schematically shown in FIG. 4A. The meander-shaped lamp is composed of several (at least substantially parallel) arms which are interconnected via connecting portions. In the example shown in FIG. 4, the backlight luminaire 30 comprises a group of sub-reflectors 22, 22', 22", etc. which are arranged in a side-by-side relation, and the lamps 24, 25 are separately connected to a power source 28, 29. The successive arm portions of the meander-shaped fluorescent lamps 24, 25 are accommodated in successive sub-reflectors 22. In addition, each sub-reflector 22 accommodates two arm portions of each meander-shaped lamp 24, 25. By virtue of this distribution of the arm portions of the lamps 24, 25 over the sub-reflectors 22, differences in color point (spectral characteristic) between the two meander-shaped lamps are distributed (spread out) in each sub-reflector accommodating a portion of each of the meander-shaped lamps. If the spectral characteristic of the meandershaped lamps 24, 25 varies (gradually), as indicated by the letters a–a'–a"–a'" etc. in FIG. 4A, then the uniformity of the backlight luminaire 30 is improved considerably if complementary arm portions of the lamps are arranged one beside the other in one sub-reflector. The light output and the homogeneity of the light distribution are further improved if the (vertical) portions of the walls 26 are provided with a reflective layer 26' having a high reflection coefficient.

Figure 5:
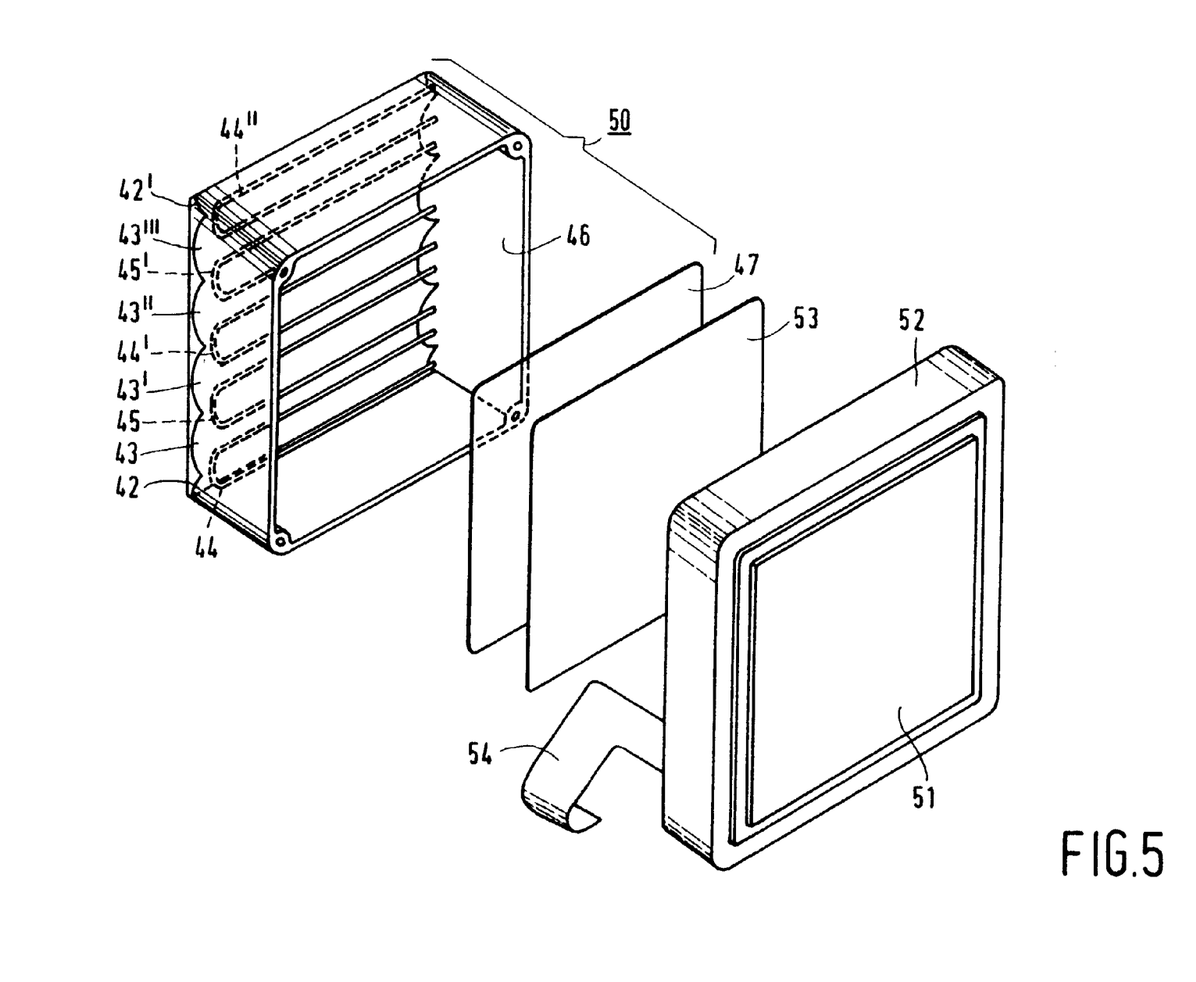
FIG. 5 is an exploded view of an assembly of a liquid-crystal display device and a backlight luminaire.

FIG. 5 is a very schematic, exploded view of an assembly of a liquid-crystal display device 51 and a backlight luminaire 50. In the example shown in FIG. 5, the liquid-crystal display device 51 is accommodated in a housing 52 which is provided with mounting means (not shown in FIG. 5) and, if necessary, a support 54. In addition, a filter 53 may be situated between the liquid-crystal display device 51 and the backlight luminaire 50. Said backlight luminaire 50 is provided with a light-scattering cover 47 (diffusor) which, in the assembled form, is supported by walls 46. In the example shown in FIG. 5, the majority of the sub-reflectors 43, 43', 43". 43'" always comprise two arm portions of two 18 different U-shaped fluorescent lamps 44, 44', 44"; 45, 45'. The upper side and the lower side of the backlight luminaire 50 are provided, in this example, with two "half" sub-reflectors 42, 42' which each accommodate only one arm portion of a fluorescent lamp 44, 44". The way in which the U-shaped fluorescent lamps 44, 45 are connected to power sources is not shown in FIG. 5. In order to maximize the light output of the backlight luminaire 50 shown in the example of FIG. 5, the connecting portions of the U-shaped fluorescent lamps 44, 45 are situated in a transition portion between two sub-reflectors and hence are an integral part of the backlight luminaire. In addition, the arm portions are so accommodated in the sub-reflectors 43, 43', 43", that a variation in spectral characteristic of the arm portions of the U-shaped fluorescent lamps 44, 45 is compensated for by the complementary arm portion of one of the other lamps 44, 45 in the sub-reflector. Preferably, each arm portion of a first fluorescent lamp 44 in one of the reflectors 43, 43", 43" is so arranged relative to each arm portion of a second fluorescent lamp 45 in the corresponding reflector 43, 43', 43" that the spectral characteristic of said arm portion of the first lamp 44 changes in a direction which is in opposition to that of the variation in spectral characteristic of said portion of the second lamp 45.

The above-described method of distributing lamps 44, 45 over the sub-reflectors 43, enables differences in color point (spectral characteristic) between two lamps to be compensated for in each sub-reflector accommodating an (equivalent) portion of at least two lamps. By virtue thereof, a substantial improvement of the uniformity of the backlight luminaire is achieved.

It will be obvious that within the scope of the invention many variations are possible to those skilled in the art.

In general, the invention relates to a backlight luminaire provided with at least two tubular fluorescent lamps, with portions of the lamps exhibiting a variation in spectral characteristic in the longitudinal direction. The portions of the lamps are so positioned relative to each other that the spectral characteristic of a portion of a first lamp and the spectral characteristic of a portion of a second lamp, which portions are arranged one beside the other, vary in opposite directions. The luminaire is further provided with a plurality of sub-reflectors, the majority of the sub-reflectors being provided with said portion of the first lamp and said portion of the second lamp. Preferably, the majority of the lamps are distributed over more than one sub-reflector. Preferably, the lamps are U-shaped and alternately connected in series. The backlight luminaire is employed in liquid-crystal display devices in order to attain a light distribution having a uniform spectral characteristic.

I claim:

1. A backlight luminaire for a display device, said luminaire comprising at least one first elongate fluorescent lamp having a first portion and a second portion and a spectral characteristic which varies in a longitudinal direction from said first portion to said second portion, at least one second fluorescent lamp having a first portion and a second portion and a spectral characteristic which varies in a longitudinal direction from said first portion to said second portion, said second elongate fluorescent lamp being substantially identical to said first elongate fluorescent lamp, each said first portion of each said second fluorescent lamp is side-by-side with one of said second portions of said at least one first fluorescent lamp, and each said second portion of each said second fluorescent lamp side-by-side with one of said first portions of said at least one first fluorescent lamp, and a reflector comprising a plurality of side-by-side concave sub-reflectors, said first and second lamps being arranged over said reflector, one of said first portions and one of said second portions being arranged side-by-side with respective said sub-reflectors.

2. A backlight luminaire as in claim 1 further comprising a first power supply and a second power supply, said at least one first fluorescent lamp being connected to said first power supply, said at least one second fluorescent lamp being connected to said second power supply.

3. A backlight luminaire as in claim 2 comprising a plurality of said first fluorescent lamps connected in series to said first power supply and a plurality of said second fluorescent lamps connected in series to said second power supply.

4. A backlight luminaire as in claim 1 wherein one of said first lamps and one of said second lamps are arranged side-by-side over each said sub-reflector.

5. A backlight luminaire as in claim 1 wherein one of said first lamps and one of said second lamps are arranged side-by-side over adjacent said sub-reflectors.

6. A backlight luminaire as in claim 1 wherein each of said first and second fluorescent lamps is U-shaped and comprises a first arm and a second arm arranged at least substantially parallel.

7. A backlight luminaire as in claim 6 wherein said first arm and said second arm of each said lamp are arranged over a respective one of said sub-reflectors.

8. A backlight luminaire as in claim 6 wherein said first arm and said second arm of each said lamp are arranged over a pair of respective said sub-reflectors.

9. A backlight luminaire as in claim 1 wherein each of said first and second lamps is meander-shaped and comprises a plurality of at least substantially parallel arms, said arms of said first lamp alternating and being arranged in parallel with said arms of said second lamp.

10. A backlight luminaire as in claim 9 wherein one of said arms of said first lamp and one of said arms of said second lamp is arranged over a respective one of said sub-reflectors.

11. A backlight luminaire as in claim 1 wherein each said fluorescent lamp comprises a glass tube having an inside surface with a mixture of phosphor components thereon, the components having a ratio which varies from said first portion to said second portion, thereby causing said spectral characteristic to vary from said first portion to said second portion.

12. A backlight luminaire as in claim 11 wherein said spectral characteristic causes a difference in color point over the length of each said lamp.

* * * * *